United States Patent
Maturi et al.

(10) Patent No.: US 9,356,964 B2
(45) Date of Patent: May 31, 2016

(54) APPLICATION BASED POLICY ENFORCEMENT

(71) Applicant: Aruba Networks, Inc., Sunnyvale, CA (US)

(72) Inventors: Mohan Maturi, San Jose, CA (US); Sridhar Kamsetty, San Jose, CA (US); Andrew E. Schweig, San Francisco, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 163 days.

(21) Appl. No.: 14/067,864

(22) Filed: Oct. 30, 2013

(65) Prior Publication Data

US 2014/0130118 A1 May 8, 2014

Related U.S. Application Data

(60) Provisional application No. 61/722,071, filed on Nov. 2, 2012.

(51) Int. Cl.
*H04L 29/06* (2006.01)
*H04L 29/08* (2006.01)

(52) U.S. Cl.
CPC .............. *H04L 63/20* (2013.01); *H04L 67/104* (2013.01)

(58) Field of Classification Search
None
See application file for complete search history.

(56) References Cited

U.S. PATENT DOCUMENTS

| | | | | |
|---|---|---|---|---|
| 7,137,144 B1* | 11/2006 | Attwood | ........... | H04L 29/12009 726/13 |
| 2005/0152364 A1* | 7/2005 | Tagami | ................ | H04L 29/06 370/389 |
| 2007/0076630 A1* | 4/2007 | Horton | .............. | H04L 29/12047 370/254 |
| 2008/0049619 A1* | 2/2008 | Twiss | ..................... | H04L 45/04 370/236 |
| 2008/0162639 A1* | 7/2008 | Kang | .................... | H04L 43/026 709/205 |
| 2010/0145912 A1* | 6/2010 | Li | ....................... | H04L 12/2602 707/622 |
| 2011/0035795 A1* | 2/2011 | Shi | ........................ | H04L 43/026 726/13 |
| 2011/0191463 A1* | 8/2011 | Liu | ......................... | G06F 15/16 709/224 |
| 2011/0229134 A1* | 9/2011 | Takita | .................... | H04L 45/38 398/58 |
| 2012/0173712 A1* | 7/2012 | Ma | ........................ | H04L 43/028 709/224 |
| 2014/0059216 A1* | 2/2014 | Jerrim | ................... | H04L 67/104 709/224 |

OTHER PUBLICATIONS

Bolla et al., "Characterizing the network behavior of P2P traffic", DIST—Department of Communication Computer and System Sciences, University of Genoa, 2008.*
Symantec, "Identifying P2P users using traffic analysis", 2010.*

* cited by examiner

*Primary Examiner* — Peter Poltorak
(74) *Attorney, Agent, or Firm* — Hewlett Packard Enterprise Patent Department

(57) ABSTRACT

One embodiment is directed to a system that comprises a network device, including at least a first port, which is configured to analyze information within one or more messages received during a session initiated by another network device. The system is configured to perform operations including determining a total number of sessions for the first port of the network device and determining whether the total number of sessions for the first port exceeds a threshold value. If the total number of sessions for the first port exceeds the threshold value, an application associated with the first port is classified as a peer-to-peer application. Thereafter, a policy may be enforced based on this classification.

25 Claims, 9 Drawing Sheets

┌─620  ┌─630
                    ↓      ↓
        ⎧   {"facebook", "facebook"},
        ⎪   {"youtube", "youtube"},                    ┌─600
        ⎪   {"ytimg", "youtube"},
        ⎪   {"amazon", "amazon"},
        ⎪   {"twitter", "twitter"},
        ⎪   {"t\\.co$", "twitter"},
        ⎪   {"taobao", "taobao"},
        ⎪   {"tbcdn", "taobao"},
        ⎪   {"linkedin", "linkedin"},
        ⎪   {"licdn", "linkedin"},
        ⎪   {"sina\\.com\\.cn$", "sina"},
        ⎪   {"sinaimg\\.cn", "sina"}'
        ⎪   {"sinajs\\.cn", "sina"},
        ⎪   {"\\.iask\\.com", "sina"},
        ⎪   {"cnn", "cnn"}, URL
        ⎪   {"abc", "abc"},
        ⎪   {"bbc.co.uk$", "bbc"}, // rank 45
        ⎪   {"bbcimg.co.uk$", "bbc"},
        ⎪                                              FIG. 6
    610⎨   Other categories
        ⎪
        ⎪   // file sharing services
        ⎪
        ⎪   {"mediafire", "fileshare"},
        ⎪   {"sendspace", "fileshare"},
        ⎪   {"yousendit", "fileshare"},
        ⎪
        ⎪   //advertising
        ⎪
        ⎪   {"\\.doubleclick\\.", "ad networks"},
        ⎪   {"\\bad[s]?[0-9\\-_]*\\.", "ad networks"},
        ⎪   {"hiro", "ad networks"},
        ⎪   {"adtally", "ad networks"},
        ⎪   {"zedo", "ad networks"}, URL
        ⎪   {"mediastrike", "ad networks"},
        ⎪   {"volomedia", "ad networks"},
        ⎪   {"hydra", "ad networks"},
        ⎪   {"nuffnang", "ad networks"},
        ⎪   {"valueclick", "ad networks"},
        ⎩   {"adfusion\\.", "ad networks"},

APPLICATION BASED POLICY ENFORCEMENT

CROSS-REFERENCE TO RELATED APPLICATIONS

This application claims the benefit of priority on U.S. Provisional Application Ser. No. 61/722,071, filed on Nov. 2, 2012, the entire content of which is incorporated by reference herein.

FIELD

Embodiments of the disclosure relate to the field of communications, and in particular, to a system, network device and method directed to (i) analysis of information within a session, (ii) utilization of at least a portion of the analyzed information to classify or determine the application associated with that session, and/or (iii) enforce policy for that particular application.

GENERAL BACKGROUND

Over the last few years, user-based policy enforcement firewalls are being deployed to address deficiencies associated with external firewalls. Conventional policy enforcement firewalls are adapted to tightly control what a user is permitted to access over a network and provide separation between user classes. However, such policy enforcement fails to address access control and optimization of network efficiency based on either the classification of an application being used during a session or the particular application itself.

BRIEF DESCRIPTION OF THE DRAWINGS

The invention may best be understood by referring to the following description and accompanying drawings that are used to illustrate embodiments of the disclosure.

FIG. 6 is an exemplary embodiment of a hostname list.

DETAILED DESCRIPTION

Figure 1:
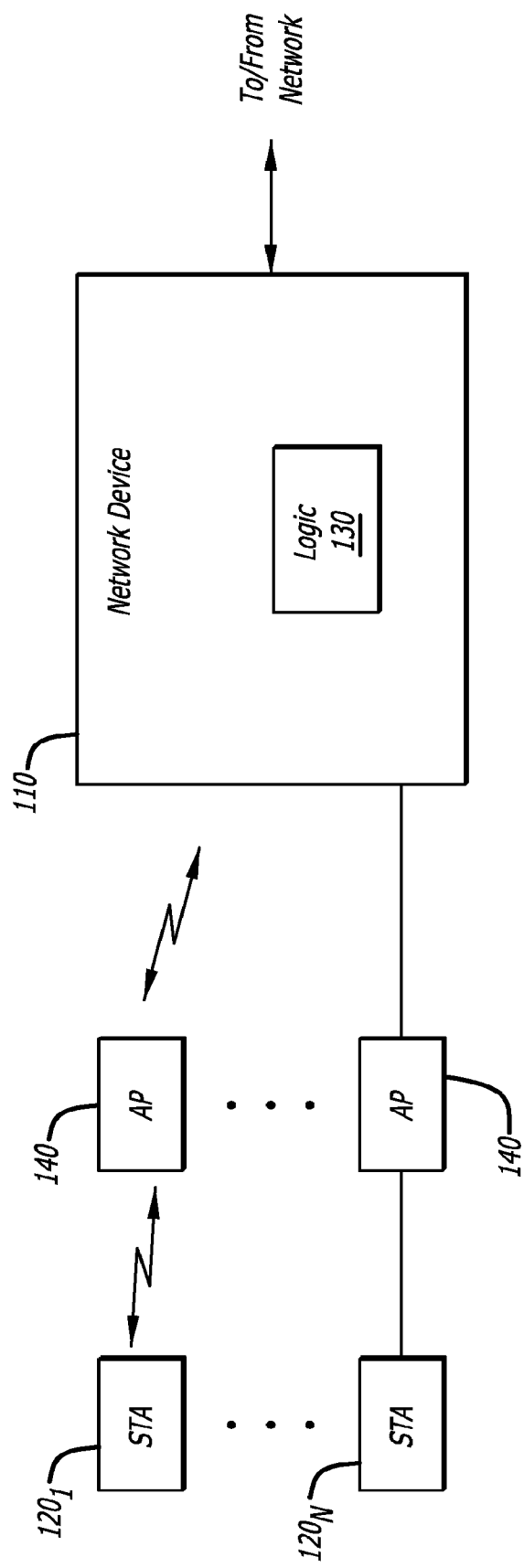
FIG. 1 is an exemplary embodiment of a network utilizing an enhanced policy enforcement firewall.

Embodiments of the disclosure are directed to a system, device and method for (i) analyzing information within one or more communication sessions (hereinafter "sessions"), and (ii) classifying an application associated with a particular session or determining the particular application associated with that session based on at least a portion of the analyzed information. Thereafter, policies may be enforced on an application basis. These policies may be tailored to allow, restrict or prohibit usage of the application based the user, location of the user, time of use, role, targeted destination, or the like.

In general, according to one embodiment of the invention, a network device comprises logic that analyzes information within a header of one or more messages received during a session initiated by another network device (e.g., a client device). From this information, the network device is able to classify the application associated with that session or to identify that application by name. As a result, the network device is able to formulate a session-to-application (session< >application) mapping, from which one or more mappings with higher granularity may be formulated, such as, for example:

session<>user<>location<>application;
session<>user<>location<>application<>device<>role<>ssid Herein, certain terminology is used to describe features of the disclosure. For example, the term "network device" generally represents electronics that support the receipt and/or transmission of wireless communications including, but not limited or restricted to a controller; an access point (AP); a base station; a data transfer device (e.g., switch, router, bridge, brouter, etc.); consumer electronics with wireless connectivity that may feature additional management functionality such as a television, a set-top box, a digital video recorder (DVR), a video gaming console, a projector, cellular phone supporting wireless (non-cellular) connectivity, and/or a television peripheral such as Apple® TV; or the like.

It is contemplated that the network device may include logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission media (e.g., electrical, optical, acoustical or other form of propagated signals such as carrier waves, infrared signals, or digital signals).

An "interconnect" is generally defined as a communication pathway established over an information-carrying medium.

This information-carrying medium may be a physical medium (e.g., electrical wire, optical fiber, cable, bus traces, etc.), a wireless medium (e.g., air in combination with wireless signaling technology) or a combination thereof. The data transferred over the interconnect may be in accordance with a variety of communication protocols including, but not limited or restricted to those protocols in accordance with WIFi™, various IEEE 802.11 standards (e.g., IEEE 802.11ac, 802.11n, etc.), or the like.

The term "message" is a grouping of data, which may be placed in the form of a packet, a frame, a stream (e.g., a sequence of packets or frames), or any other series of bits having a prescribed format.

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations are not set forth in detail in order to avoid unnecessarily obscuring this description.

I. Network Architecture

Referring to FIG. 1, an exemplary embodiment of a network 100 supporting application-based policy enforcement is shown. Herein, network 100 comprises a network device 110 that is adapted to receive communications from other network devices (e.g., client devices or "STAs") $120_1$-$120_N$, where $N \geq 1$ via one or more intermediary network devices (e.g. APs) 140.

Herein, network device 110 comprises logic 130 that is configured to identify applications assigned to specific client software ports through analysis of information within each session. In general, according to one embodiment of the disclosure, logic 130 operates as a policy enforcement firewall (PEF) that is configured to access information, namely a port number at an Internet Protocol (IP) address, from a message within that session. If the total number of sessions for that particular port is greater than a certain threshold, the application associated with that particular port is determined to be a peer-to-peer (P2P) application.

More specifically, network device 110 may be configured with logic 130 that accesses information in a header of a message associated with that session, namely a Source (SRC) port number at SRC IP address. The SRC port is uniquely assigned to an application. In the event that the number of different sessions from the same SRC port and SRC IP address exceed a certain threshold, the application associated with that SRC port is determined to be a P2P application. Once the determination has been made, P2P policies can be applied to data being transmitted or received from that port such as bandwidth constraints.

Furthermore, network device 110 may be configured with logic 130 that is adapted to perform database building based on Domain Name System (DNS) traffic. According to one embodiment of the disclosure, logic 130 performs a Domain Name System (DNS) snoop on a DNS Response that is prompted by a DNS Request made during the session. Thereafter, logic 130 performs a mapping of a targeted destination (e.g. a destination "DEST" IP address) to a snooped DNS name. Next, one or more applications (e.g., cloud-based applications) are mapped to the DNS name through application of pre-canned regular expressions on the DNS name. Hence, the session is mapped to an application.

Figure 2:
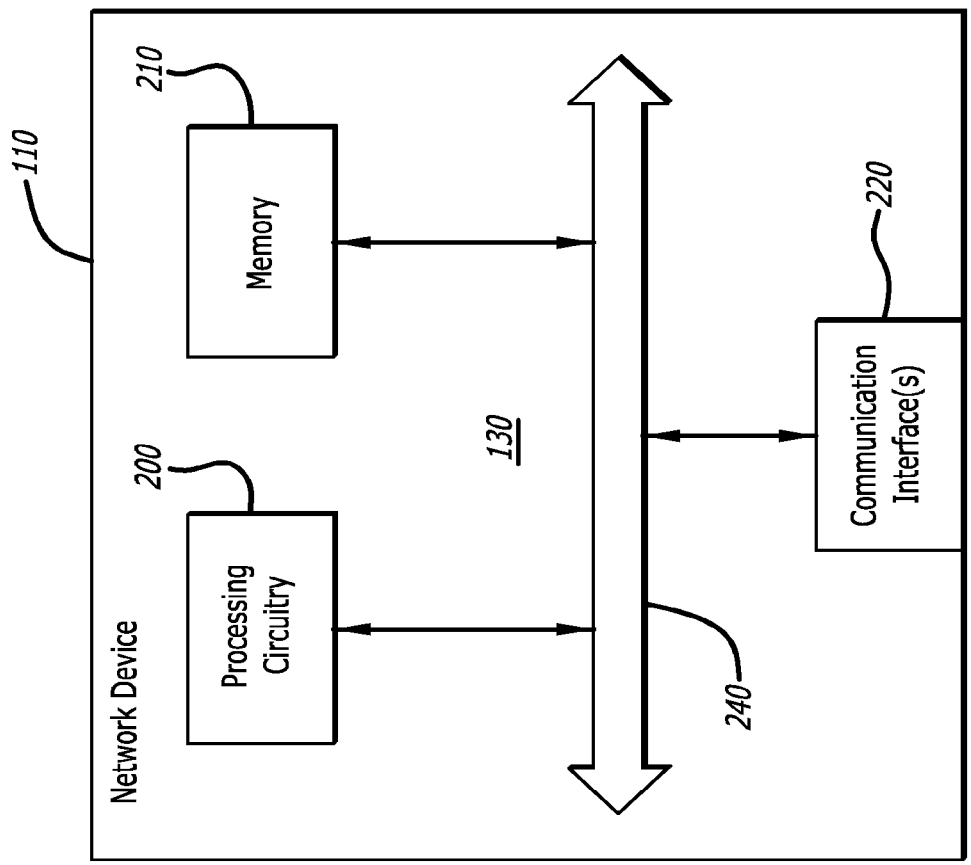
FIG. 2 is an exemplary embodiment of a network device implemented within the enhanced policy enforcement firewall of FIG. 1.

Referring now to FIG. 2, an exemplary embodiment of network device 110 operating in combination with cloud-based service 110 is shown. In accordance with one embodiment of the disclosure, logic 130 within network device 110 comprises a processing circuitry 200, a memory 210 and/or a communication interface 220 that is adapted to communicate with other devices supporting wired and/or wireless connectivity. These logic units are coupled together by an interconnect 240. As shown, communication interface 220 may comprise a wired port and/or one or more radios, tuners, and/or antenna(s) that support wireless communications.

According to one embodiment of the disclosure, memory 210 may be a type of non-volatile memory that is adapted to store information obtained during a session (e.g., session identifier, SRC IP address, SRC port number, DEST IP address, DEST port number, protocol type, user name, device/OS type, role information for the user of transmitting network device such as guest or department identifier, Service Set Identifier (SSID) used during session, client location and/or a hostname list). Memory 210 may further store heuristics and policy information, where the policy information applies access controls on network 100 to different applications.

II. Application-Port Identification

Figure 3:
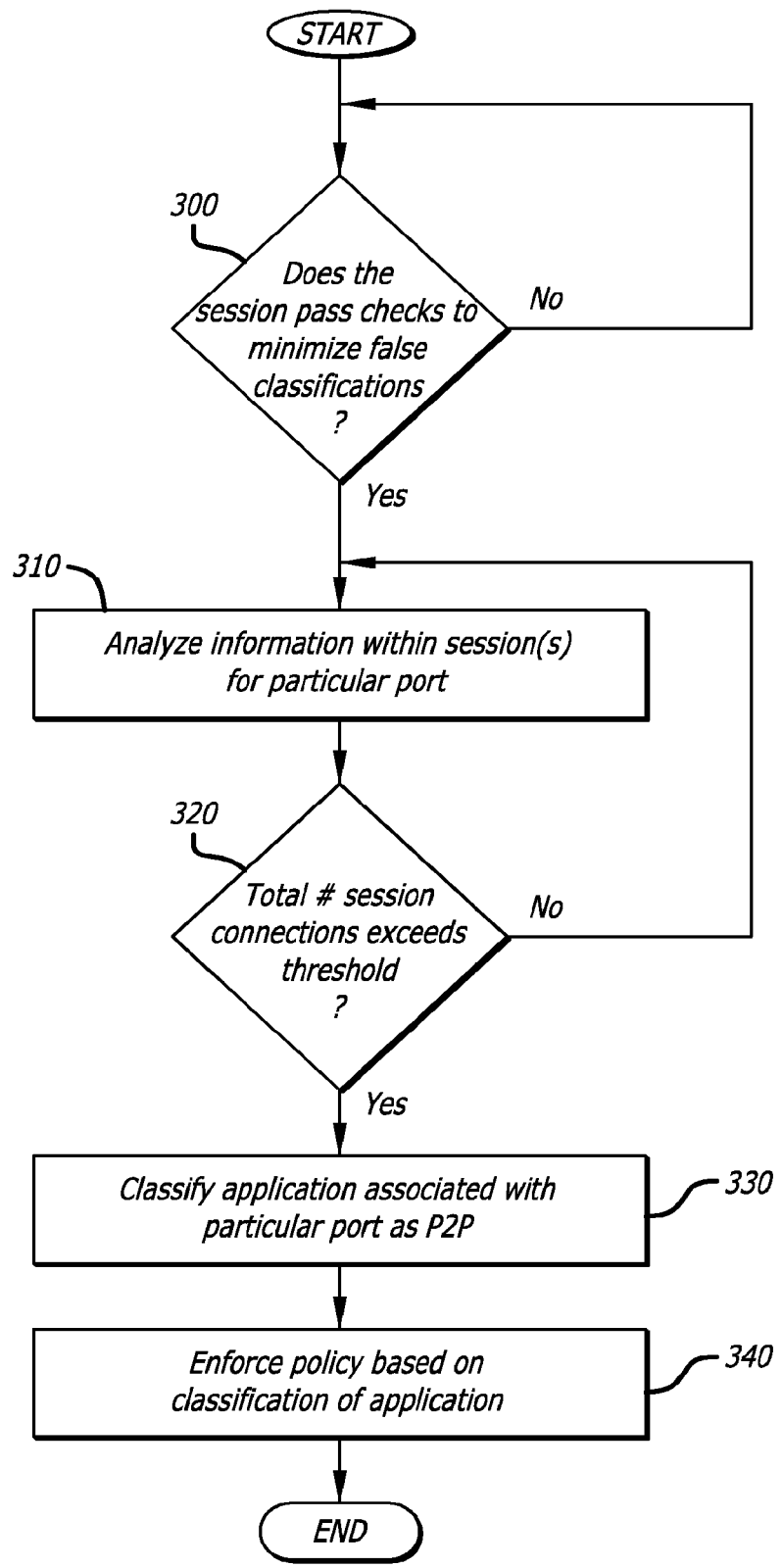
FIG. 3 is an exemplary embodiment of a first inventive aspect of the enhanced policy enforcement firewall of FIG. 1.

As shown in FIG. 3, an exemplary embodiment of a first inventive aspect of the enhanced policy enforcement firewall of FIG. 1 is shown. Herein, the policy enforcement firewall may be adapted to conduct checks to minimize false (incorrect) classifications (block 300). Thereafter, if the checks are passed, the information within multiple sessions is analyzed (block 310). For instance, the SRC port number, SRC IP address, DEST port number and DEST IP address may be obtained for each session. All sessions that identify a particular port (e.g., SRC or DEST port number) can be used to identify the total number of connections (e.g. sessions) for that particular port. If the total number of connections for that particular port exceeds a certain threshold, then the application associated with that particular port is classified as a peer-to-peer (P2P) application (blocks 320 and 330).

Upon classifying the application, policy is enforced based on at least the classification of the application (block 340). Of course, other factors besides classification may be used to influence policy enforcement decisions.

Figure 4:
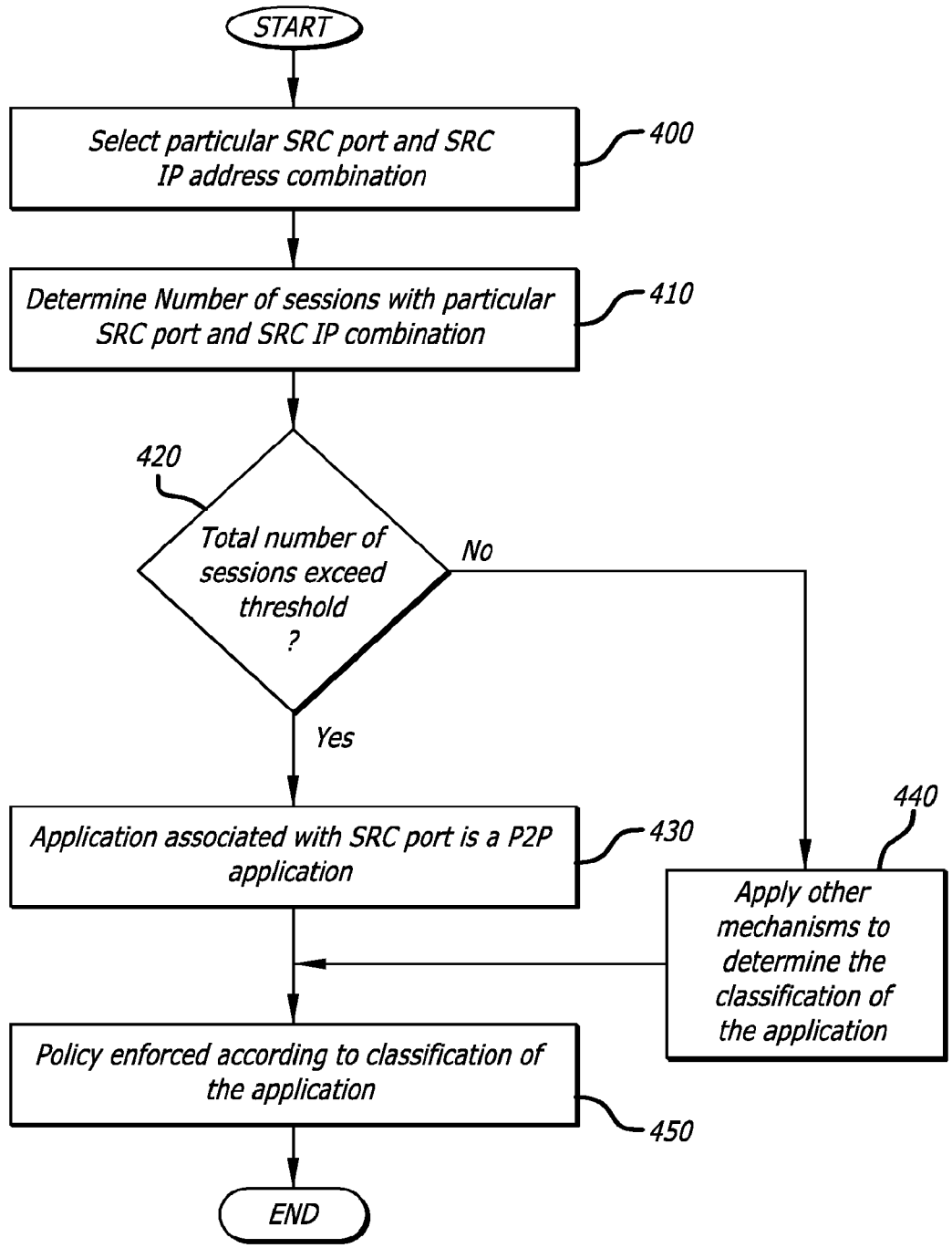
FIG. 4 is an exemplary embodiment of a flowchart illustrating classification of an application as a peer-to-peer (P2P) application based on SRC port number and SRC IP address associated with the session.

For example, referring to FIG. 4, when conducting an analysis from the client perspective (i.e. analyzing sessions originating from a particular SRC port number and SRC IP address), a particular SRC port and SRC IP address is selected (block 400). Next, a determination is made as to the number of sessions that identify a particular SRC port number & SRC IP address (block 410). Each session features a different DEST port number and DEST IP address. If the total number of sessions for that particular SRC port and SRC IP address combination exceeds a certain threshold (block 420), then the application associated with that particular SRC port is determined to be a P2P application (block 430).

Otherwise, the application is not classified as a P2P application and other mechanisms are applied to determine the classification for the application (block 440). As an illustrative example, for all sessions that are not P2P related, we apply other methods of identifying an application, like using predefined algorithms, destination port range mapping to an application, and/or looking up IRNA ports.

Upon classifying the application as a P2P application or another classification, policy is enforced based on at least that classification (block 450). According to this illustrative embodiment, for P2P applications for example, one policy may be that bandwidth constraints are enforced on that application if the total number of P2P connections for all P2P applications utilized over a network exceeds a prescribed threshold. It is contemplated that the total number of P2P connections throughout a network may be determined based on the aggregate of sessions involving all classified P2P applications determined by the enhanced policy enforcement firewall.

For instance, as an illustrative example, six (6) applications A-F are running on a network (client) device. Of these applications, as described above application A for the particular SRC port and SRC IP address is a P2P application supporting five (5) sessions. Another application (application C) is a P2P application supporting ten (10) sessions. As part of policy enforcement, the total number of P2P connections (A+C=15) is determined and compared to the prescribed threshold to determine if a policy is to be enforced on application A (e.g., enforce prescribed bandwidth constraints; impose a timeout for particular session after an amount of time has elapsed, etc.).

It is contemplated that a few additional checks may be conducted to minimize false P2P detections. For instance, if there are multiple sessions from a given SRC IP address using different SRC ports to the same DEST IP address, DEST port combination, all such SRC IP, SRC port combinations are ignored. For example:

SRC IP1, SRC Port 1->Dest IP 1, Dest Port 1
SRC IP1, SRC Port 2->Dest IP 1, Dest Port 1
(SRC IP1, SRC Port1) & (SRC IP 1, SRC Port 2) are ignored from further analysis.

As another example, if the SRC port is less than 1024, then the SRC IP, SRC port combination may be ignored. Also, if the DEST port maps to a well known application or a known algorithm, then the SRC IP, SRC port combination are ignored.

III. Database Building Based on DNS Traffic

Figure 5:
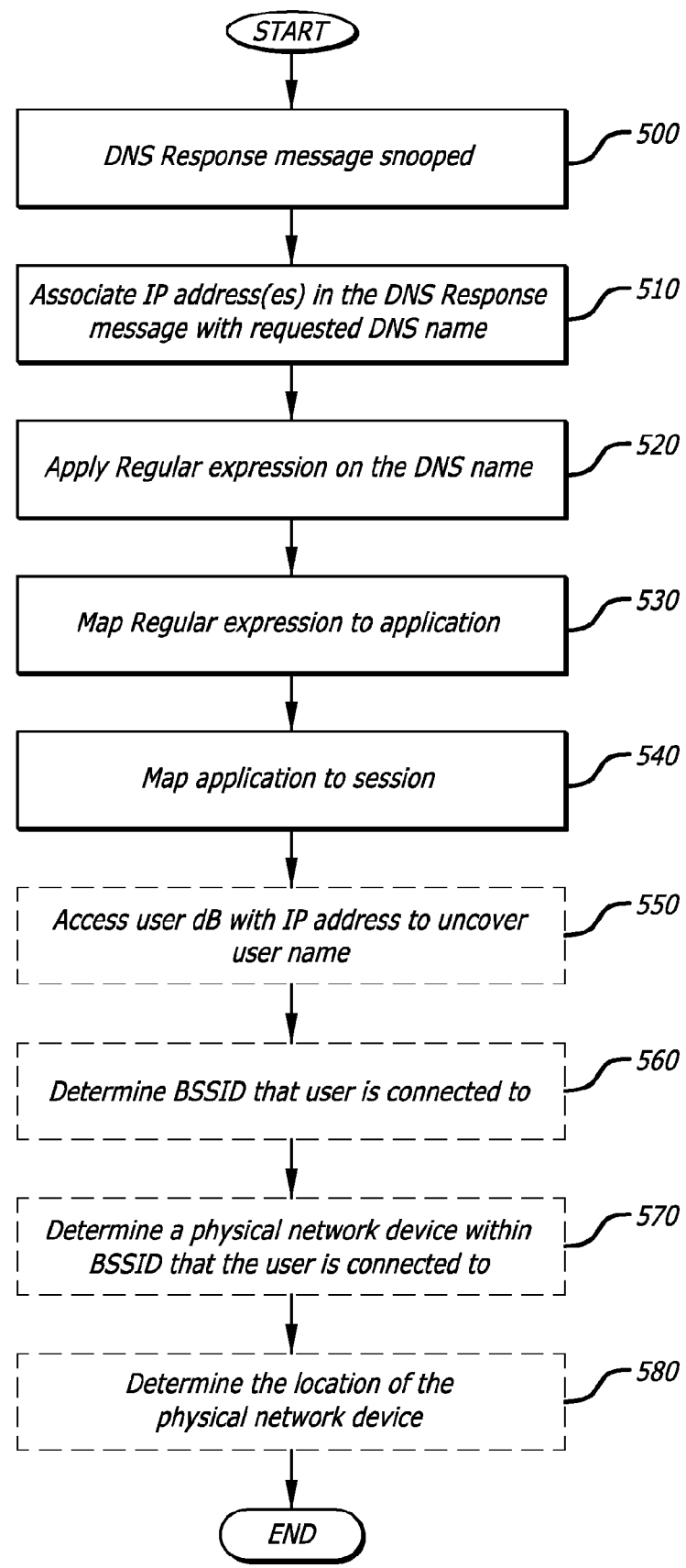
FIG. 5 is an exemplary embodiment of a second inventive aspect of the enhanced policy enforcement firewall of FIG. 1.

As shown in FIG. 5, an exemplary embodiment of a second inventive aspect of the enhanced policy enforcement firewall of FIG. 1 is shown. According to one embodiment of the disclosure, a protocol for the establishment of multi-parameter mapping, such as session< >application mapping or a mapping involving such parameters is described.

Herein, during a session and in response to a prior DNS Request message, a DNS Response message is snooped (block 500). According to one embodiment of the disclosure, the DNS Response message may include one or more IP addresses operating as pointers to content stored at different locations. Upon conducting a snoop operation, the IP address(es) are detected and stored in memory of the network device.

Next, the IP address(es) in the DNS Response message are associated to the requested DNS name set forth in the DNS Request message (block 510). Thereafter, a regular expression is applied on the DNS name and the regular expression is mapped to an application, such as a cloud-based application for example, through the use of a hostname list that includes a regular expression and its corresponding application name (blocks 520 and 530).

Referring now to FIG. 6, an exemplary embodiment of a hostname list 600 is shown. Herein, it is shown that list 600 is preloaded into memory of the network device and may be updated automatically by network device or by an administrator of the network. Each entry 610 of list 600 comprises a regular expression 620, such as a pattern of alphanumeric characters and/or symbols to denote a particular application, and a name of the corresponding application 630. Hence, access to a particular regular expression enables discovery of the corresponding application name.

Each regular expression and application name pair 620/630 may be categorized within list 600 based on application service type. For instance, as shown, list 600 may comprise expression/application pairs directed to video streaming (e.g. YouTube®, CNN®, ABC®, BBC®); social media (e.g. Facebook®, Twitter®, etc.); productivity (e.g. salesforce.com®, Google® Docs, Box™, etc.); filesharing (e.g. Yousendit®, Mediafire®, etc.); and/or advertising (e.g. Doubleclick®, Adfusion®, etc.).

Referring back to FIG. 5, upon completion of the mapping of the application to the requested DNS name, the application may also be mapped to the session (block 540) as this information is learned from the snoop of the DNS Response message as well. Hence, a session< >application mapping is created.

This mapping relationship can be extended to create a mapping between a greater number of parameters, including but not limited or restricted to one or more of the following: user, location, device, role, and/or SSID. For instance, by performing the following operations (1)-(4) below, user and location may be uncovered to produce a session< >user< >location< >application mapping:

1) Accessing a user database with either the SRC IP address or DEST IP address to uncover the user (name)—block 550;
2) Determining the Basic Service Set Identifier (BSSID) that the user is connected to—block 560;
3) Determining a physical network device (e.g., AP) within the BSSID that the user is connected to—block 570;
4) Determining the location of the physical network device—block 580.

Figure 7:
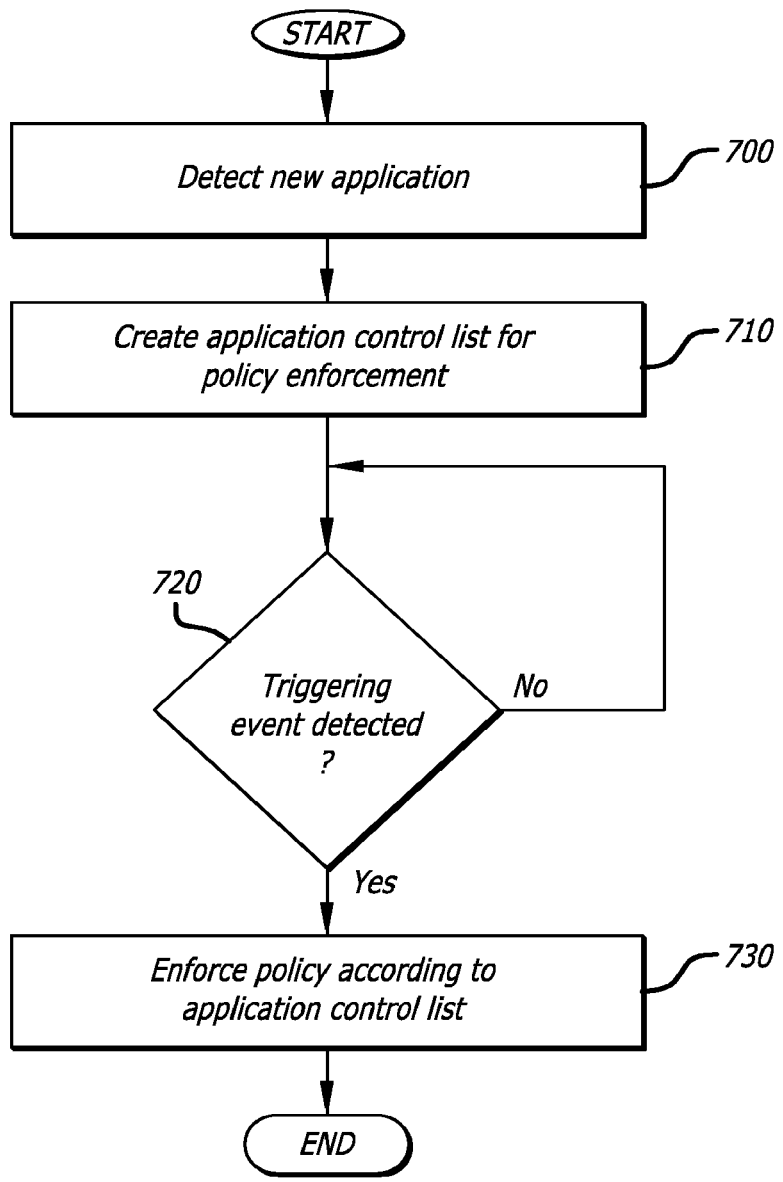
FIG. 7 is an exemplary embodiment of policy enforcement based on aggregated statistics derived from formulation of session< >user< >location< >application<>device< >role< >SSID mapping.

Referring to FIG. 7, an exemplary embodiment of policy enforcement based on aggregated statistics derived from formulation of session< >user< >location< >application< >device< >role< >SSID mapping is shown. For instance, upon detecting a new application (block 700), the network device is adapted with create real-time application control list (ACL) for policy enforcement for this application (block 710). Policy enforcement involves the alteration of usage patterns for a given application, where such usage patterns may be based on aggregate network usage. According to one embodiment of the disclosure, the application control list is updated whenever a user tries to use the given application.

Upon detecting a triggering event (block 720), policy is enforced (block 730). This may involve allowing, blocking or restricting access to network services for the given application, adjusting access based on quality of service (QoS) levels, and/or logging usage on a per use or per role basis.

As an illustrative example, the policy enforcement firewall may feature an application control list that determines if there are too many users with a certain role (e.g., employees of the legal department) having active social media sessions. Upon detecting that the number of employees within the legal department of company A exceeds a given threshold, certain policies may be enforced. These policies may include prohibiting network access by social media applications identified on hostname list 600 of FIG. 6, or restricting access by social media applications only when the location of the user is within a certain coverage area (e.g., within the cafeteria) or another public group location.

Figure 8:
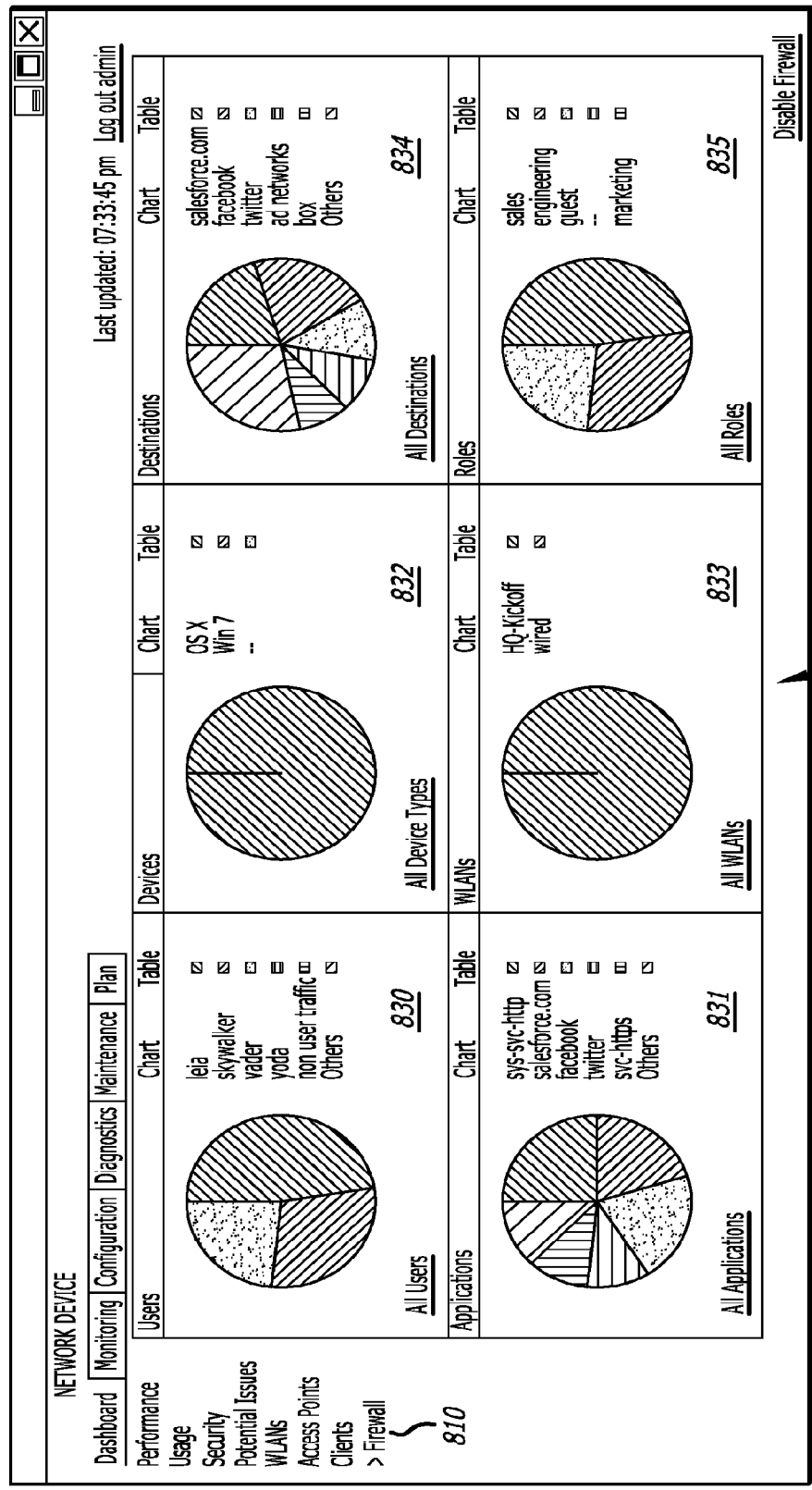
FIG. 8 is an exemplary embodiment of a Network Visibility dashboard.

Referring now to FIG. 8, an exemplary embodiment of a Network Visibility dashboard 800 is shown. Herein, upon selection of activity button Firewall 810, one or more summary reviews 820 are provided. These summary reviews 820 include are based on aggregated statistics maintained by the network device and include the following:

- summary of active users 830 detected by the network device;
- summary of applications 831 having active sessions detected by the network device;
- summary of devices (OS) 832 detected by the network device;
- summary of WLANs 833 detected by the network device;
- summary of destinations (DNS names) 834 detected by the network device; and
- summary of roles 835 for the users detected by the network device.

Figure 9:
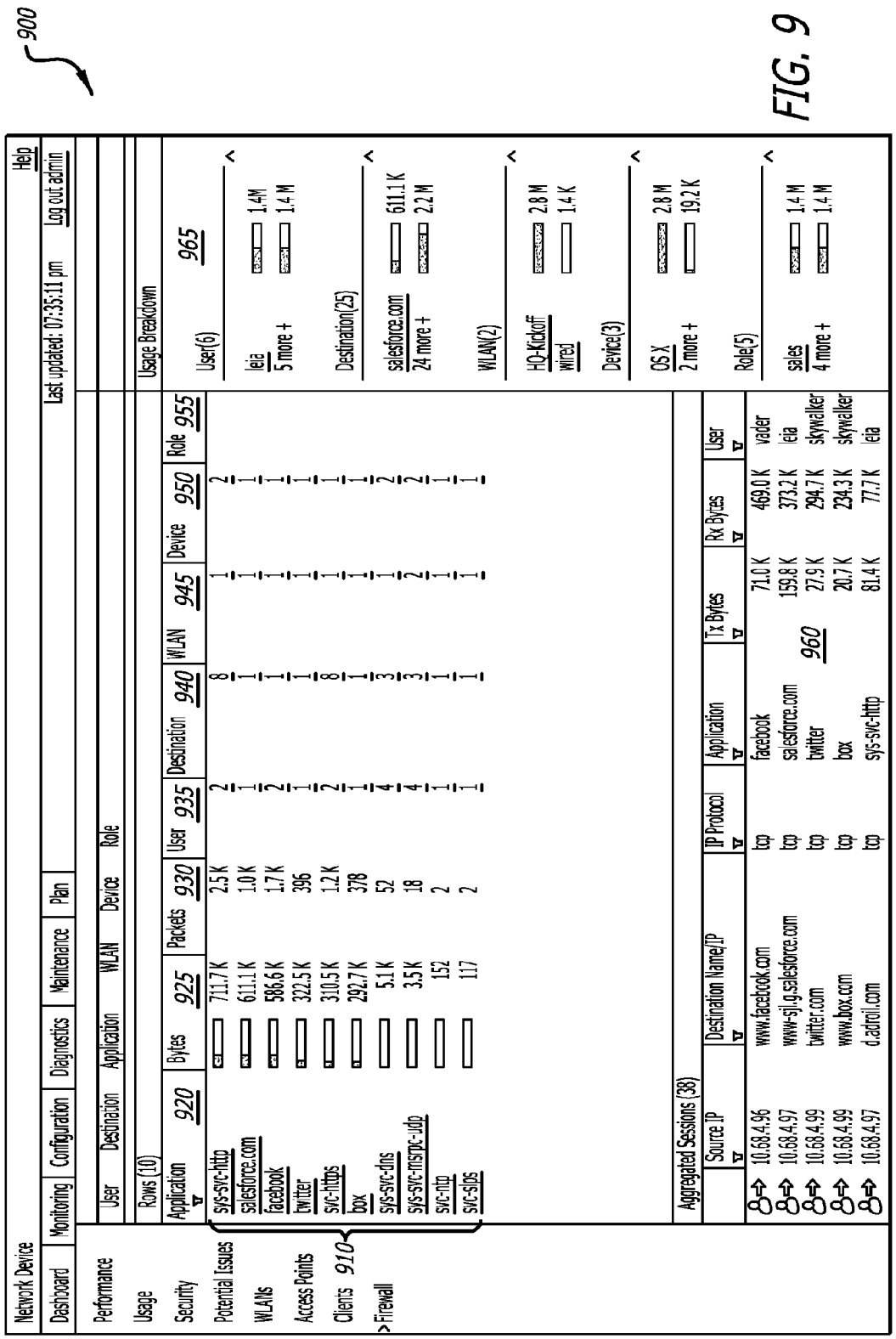
FIG. 9 is an exemplary embodiment of an Application View dashboard.

Referring now to FIG. 9, an exemplary embodiment of an Application View dashboard 900 is shown. Herein, upon selecting the view all applications link 840 of FIG. 8, a listing of applications 910 is provided. Each listing includes the application name 920, size (bytes) 925, number of packets sent 930, user identifier 935, destination 940, WLAN over which application communicates 945, device type 950, and role 955. Furthermore, aggregated sessions 960 and usage breakdown 965 may be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the subsequently filed claims and their equivalents. The descriptions are thus to be regarded as illustrative instead of limiting.

What is claimed is:

1. A non-transitory computer-readable storage medium comprising instructions which, when executed by at least one hardware processor on a network device, causes performance of operations, comprising:
   - determining a total number of sessions for a first port of the network device;
   - determining whether the total number of sessions for the first port exceeds a threshold value;
   - classifying an application associated with the first port as a peer-to-peer application in response to a determination that the total number of sessions for the first port exceeds the threshold value;
   - determining whether the application supports multiple sessions from a particular source address using different source ports to a common destination address and destination port;
   - excluding sessions associated with at least the first port and the second port from the classification of the application; and
   - enforcing, with the network device, a policy on the application based on the classification of the application as a peer-to-peer application.

2. The non-transitory computer-readable storage medium of claim 1, wherein the first port is a source (SRC) port.

3. The non-transitory computer-readable storage medium of claim 1, wherein the at least one hardware processor further causes performance of operations comprising:
   - determining whether at least two sessions are from a first source address, the at least two sessions include a first session from the first source address using the first port and a second session from the first source address using a second port;
   - determining whether both the first session from the first source address using the first port and the second session from the first source address using the second port are directed to an identical destination address and destination port; and
   - classifying the first port and the second port to be different than a peer-to-peer port so that applications associated with the first port and the second port are to be classified differently than a peer-to-peer application.

4. The non-transitory computer-readable storage medium of claim 3, wherein the first port is a source port and the second port is a source port.

5. The non-transitory computer-readable storage medium of claim 4, wherein the first port is different from the second port.

6. The non-transitory computer-readable storage medium of claim 1, wherein enforcing a policy based on a classification of the application as a peer-to-peer application includes enforcing bandwidth constraints on the application in response to a determination that a total number of peer-to-peer sessions for all detected peer-to-peer applications on the network exceed a prescribed threshold.

7. The medium of claim 1, further comprising:
   - instructions which, when executed by at least one hardware processor on the network device, causes performance of operations, comprising:
     - detecting addressing information within a Domain Name System (DNS) response message;
     - mapping the addressing information to a DNS name;
     - applying a regular expression on the DNS name, the regular expression being a pattern of at least one of alphanumeric characters and symbols;
     - matching the regular expression to an application; and
     - mapping a session to the application based on addressing information included within the session to form a session-application mapping.

8. The non-transitory computer-readable storage medium of claim 7, wherein the DNS name is obtained from a DNS Request message associated with the DNS response message.

9. The non-transitory computer-readable storage medium of claim 7, wherein the addressing information includes one or more Internet Protocol (IP) addresses operating as pointers to stored content.

10. The non-transitory computer-readable storage medium of claim 9, wherein the matching of the regular expression to the application includes analysis of a hostname list preloaded within a memory of the network device, the hostname list includes a plurality of regular expressions and a corresponding plurality of application names.

11. The non-transitory computer-readable storage medium of claim 7, wherein the session-application mapping is used for policy enforcement of the application.

12. The non-transitory computer-readable storage medium of claim 11, wherein the policy enforcement of the application includes controlling access to network services for the application.

13. The non-transitory computer-readable storage medium of claim 11, wherein the policy enforcement of the application includes adjusting access to network services based on quality of service levels.

14. The non-transitory computer-readable storage medium of claim 11, wherein the policy enforcement of the application includes logging usage of the application on at least one of a per-use or per-role basis.

15. A system comprising a network device, including at least a first port, that is to analyze information within one or more messages received during a session initiated by another network device, the system to perform operations comprising:

determining a total number of sessions for the first port of the network device;

determining whether the total number of sessions for the first port exceeds a threshold value;

classifying an application associated with the first port as a peer-to-peer application if the total number of sessions for the first port exceeds the threshold value;

determining whether the application supports multiple sessions from a particular source address using different source ports to a common destination address and destination port;

excluding sessions associated with at least the first port and the second port from the classification of the application; and enforcing, with the network device, a policy on the application based on the classification of the application as a peer-to-peer application.

16. The system of claim 15, wherein the first port is a source (SRC) port.

17. The system of claim 15, wherein enforcing the policy on the application based on a classification of the application includes enforcing bandwidth constraints on the application.

18. The system of claim 15, wherein the system further causes performance of operations comprising:

determining whether at least two sessions are from a first source address, the at least two sessions include a first session from the first source address using the first port and a second session from the first source address using a second port;

determining whether both the first session from the first source address using the first port and the second session from the first source address using the second port are directed to an identical destination address and destination port; and classifying the first port and the second port to be different than a peer-to-peer port so that applications associated with the first port and the second port are to be classified differently than a peer-to-peer application.

19. The system of claim 18, wherein the first port is a source port and the second port is a source port that is different from the first port.

20. The system of claim 15, the system further to perform operations comprising:

detecting addressing information within a Domain Name System (DNS) response message;

mapping the addressing information to a DNS name;

applying a regular expression on the DNS name, the regular expression being a pattern of at least one of alphanumeric characters and symbols;

matching the regular expression to an application; and mapping a session to the application based on addressing information included within the session to form a session-application mapping.

21. The system of claim 20, wherein the DNS name is obtained from a DNS Request message associated with the DNS response message.

22. The system of claim 20, wherein the addressing information includes one or more Internet Protocol (IP) addresses operating as pointers to stored content.

23. The system of claim 22, wherein the matching of the regular expression to the application includes analysis of a hostname list preloaded within a memory of the network device, the hostname list includes a plurality of regular expressions and a corresponding plurality of application names.

24. The system of claim 20, wherein the session-application mapping is used for policy enforcement of the application.

25. The system of claim 24, wherein the policy enforcement of the application includes at least one of (1) controlling access to network services for the application, (2) adjusting access to network services based on quality of service levels, and (3) logging usage of the application on at least one of a per-use or per-role basis.

* * * * *